United States Patent [19]

Mimura et al.

[11] Patent Number: 4,967,357
[45] Date of Patent: Oct. 30, 1990

[54] CONSTANT SPEED HOLDING APPARATUS

[75] Inventors: Munehiko Mimura; Takumi Tatumi; Yasuo Naito; Kazuyori Katayama, all of Himeji, Japan

[73] Assignee: Mitsubishi Denki Kabushiki Kaisha, Tokyo, Japan

[21] Appl. No.: 213,046

[22] Filed: Jun. 29, 1988

[30] Foreign Application Priority Data

Jul. 2, 1987 [JP] Japan ................................. 62-167178

[51] Int. Cl.⁵ ...................... B60K 31/10; B60K 41/18
[52] U.S. Cl. .............................. 364/426.04; 180/178; 364/424.1; 474/11
[58] Field of Search ........................ 364/424.1, 426.04; 180/175, 176, 177, 178, 179; 74/866; 474/12, 18, 28, 11

[56] References Cited

U.S. PATENT DOCUMENTS

| | | | |
|---|---|---|---|
| 4,621,705 | 11/1986 | Etoh | 364/426.04 |
| 4,658,929 | 4/1987 | Kotou et al. | 180/175 |
| 4,697,478 | 10/1987 | Mastumoto et al. | 180/177 |
| 4,704,683 | 11/1987 | Osanai | 364/424.1 |
| 4,716,872 | 1/1988 | Pol | 180/176 |
| 4,735,112 | 4/1988 | Osanai et al. | 74/866 |
| 4,854,920 | 8/1989 | Mimura | 474/28 |

FOREIGN PATENT DOCUMENTS 305156  3/1989  European Pat. Off. ............ 180/176
60-135335 7/1985 Japan .

OTHER PUBLICATIONS

PCT application PCT/JP87/00631.

*Primary Examiner*—Felix D. Gruber
*Attorney, Agent, or Firm*—Sughrue, Mion, Zinn, Macpeak & Seas

[57] ABSTRACT

A constant speed holding apparatus which, once a vehicle speed is set, maintains the cruise of the vehicle at constant speed by both variable speed control and throttle control. The difference between the set speed and actual speed is detected during vehicle cruise, and if the difference is smaller than a predetermined minute value, the variable speed ratio at the time of the detection is maintained by a correction means so that any possible speed vibration due to mutual interference between variable speed control and throttle control is effectively prevented.

4 Claims, 6 Drawing Sheets

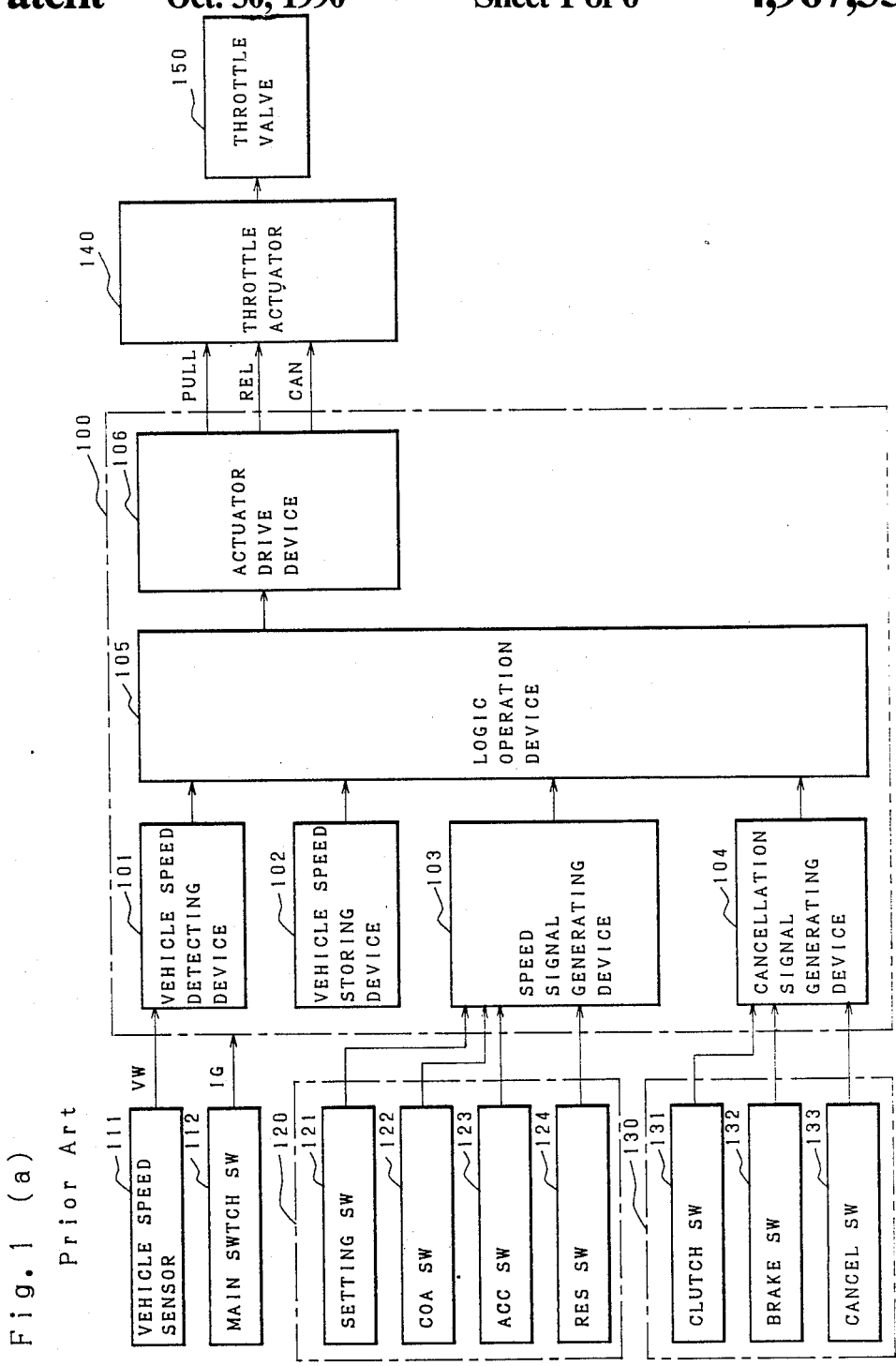
Fig. 1 (a) Prior Art

CONSTANT SPEED HOLDING APPARATUS

BACKGROUND OF THE INVENTION

1. Field of the Invention

This invention relates to a constant speed holding apparatus for maintaining a vehicle at a constant cruising speed and, more particularly, to a constant speed holding apparatus maintaining the vehicle at a constant cruise speed through both variable speed ratio control and throttle control.

2. Description of the Prior Art

The conventional constant speed holding apparatus of this type are shown, for example, in Japanese Provisional Patent Publication Nos. 135335/1985; 39311/1983; and 29018/1983. Also, one such apparatus is described in the specification of PCT/JP87/00631, a PCT application filed by the present inventor.

A block diagram is given in FIG. 1 which illustrates the arrangement of these prior art apparatuses in a summarized form.

Referring to FIG. 1(a), the numeral 100 designates a constant speed cruise control unit, which comprises a vehicle speed detecting device 101, a vehicle speed memory device 102, a speed signal generating device 103, a cancellation signal generating device 104, a logic operation device 105, and an actuator drive device 106.

The constant speed cruise control unit 100 goes into operation as it receives an ignition signal IG from a main switch, and an actual vehicle speed value $V_W$ is inputted from a vehicle speed sensor 111 to the control unit 100, the actual vehicle speed $V_W$ being then detected by the vehicle speed detecting device 101. The detected actual speed value is outputted to the logic operation device 105, which also receives relevant data from the vehicle speed memory device 102. In the memory device 102, a preset vehicle speed or a target vehicle speed, set by the driver, is stored.

The numeral 120 designates a group of command switches which are cruise condition detecting means, i.e., switches for cruise condition setting by the driver. They include a set switch 121, a COA switch 122, an ACC switch 123, and an RES switch 124.

The set switch 121 is a command switch which stores a present vehicle speed as a set vehicle speed and controls the cruise speed of the vehicle thereafter on the basis of the stored set speed.

The COA switch 122 is a command switch for use in reducing the set vehicle speed to a level below the existing vehicle speed.

The ACC switch 123 is a command switch for use in increasing the set vehicle speed to a level above the existing vehicle speed, which performs acceleration control to provide better acceleration feeling.

The RES switch 124 is a command switch for providing an accelerated or decelerated cruise condition or a constant speed cruise condition on the basis of a previously stored set vehicle speed as a target value.

The output of each of the group of command switches 120 is sent to the speed signal generating device 103 of the constant speed cruise control unit 100.

The speed signal generating device 103, as it receives the output of each of the command switches 120, generates a corresponding desired speed signal and outputs the same to the logic operation device 105.

The numeral 130 designates a group of cancellation switches as means for detecting conditions for cancellation. The cancellation switches 130 include a clutch switch 131, a brake switch 132, and a cancel switch 133. The cancellation switches 130 are for cancelling the existing state of constant speed cruise control by the manipulation of a driver, the output of the switches 130 being sent to the cancellation signal generating device 104 of the constant speed cruise control unit 100.

It is generally known that both the cancellation switches 130 and the command switches 120 can be arranged in various ways according to the types of the vehicles in which they are mounted, but their basic roles are essentially same in all cases.

The logic operation device 105 in the constant speed cruise control unit 100 performs a specified logic operation on the basis of the outputs from the vehicle speed detecting device 101, the vehicle speed memory device 102, the speed signal generating device 103, and the cancellation signal generating device 104, to control the the actuator drive device 106, thereby to drive a throttle actuator 140. In this way, the opening of a throttle value 150 is controlled to permit constant speed cruise of the vehicle at the set vehicle speed.

A continuous variable transmission 250 includes pulleys disposed at its input and output sides and a V-belt, each of the pulleys being hydraulically variable in P.C.D (Pitch Circle Diameter) so that the transmission 250 is variable in variable-speed ratio, as shown in FIG. 1(b).

A continuous variable transmission control unit 200 consists of a regulating hydraulic pressure generating device 201, a variable speed hydraulic pressure generating device 202, and a CVT (continuous variable transmission) actuator drive device 203 as continuous variable transmission regulating means.

The continuous variable transmission control unit 200 receives outputs of various vehicle cruise information detecting devices including an input rotation angle sensor 211 and an output rotation angle sensor 212, both for detecting an actual variable speed ratio, a range position sensor 213 for drawing such cruise performance as desired by the driver, a throttle opening sensor 214 for detecting necessary throttle opening for meeting the driver's acceleration requirements, an engine-control information detecting device 220 for detecting information necessary for determining the condition of the engine, and a vehicle cruise control information detecting device 230 for detecting information necessary for vehicle cruise, and accordingly drives a regulating hydraulic pressure actuator 240 for regulating the hydraulic pressure from the output-side pulley of the continuous variable transmission correspondingly to the transmission power of the engine and a variable-speed hydraulic pressure actuator 241 for controlling the hydraulic pressure from the input-side pulley of the continuous variable transmission correspondingly to the variable speed ratio.

The manner of operation will be explained.

FIG. 2 is a flow chart showing the sequence of operations of the continuous variable transmission control unit 200 disclosed in aforesaid Japanese Provisional Patent Publication No. 135335/1985. In FIG. 2, steps S402 and S410 are not part of the prior art, but are present to facilitate a ready comparison between the present invention and the prior art. Steps S402 and S410 correspond respectively to steps S420 and S430 in FIG. 4.

In FIG. 2, a throttle opening data $\theta_{TH}$ from the throttle opening sensor 214, an input-side rotation speed data $N_I$, from the input rotation angle sensor 211, an output-side rotation speed data $N_O$ from the output rotation angle sensor 212, and a range position signal Sel from the range position sensor 213 are respectively read at step S401.

The next step S402, which is not in the prior art, is a routine for deciding whether the variable speed ratio requires compensation or not. Such compensation requirement arises when the throttle opening $\theta_{TH}$ is either in a non-open state or in a fully open state. When such compensation requirement occurs, processing advances to step S410.

This step S410 is a processing routine for various kinds of compensation. At step S411 included in the step S410, according to the need arising at step 402 for compensation of the variable speed ratio, a target input shaft rotation speed $N_{IS}$ is calculated, and at step S412 a target variable speed ratio $R_S$ is calculated on the basis of the target input shaft rotation speed $N_{IS}$ and the present vehicle speed. After the target variable speed ratio $R_S$ is obtained, processing advances to step S404, at which variable speed ratio control is performed as will be described hereinafter.

Otherwise, ordinary variable speed ratio control is performed at step S403, an engine characteristic routine, by calculating an engine-generated torque $\tau_e$ on the basis of the throttle opening $\theta_{TH}$ and the target input shaft rotation speed $N_{IS}$, both read at step S401, if the decision at step S402, the routine for deciding whether the variable speed ratio requires compensation or not, is that such compensation is unnecessary. For the purpose of this calculation a map is used.

Subsequently, at step S404, a routine for regulating hydraulic pressure calculation, regulating hydraulic pressure $P_L$ is calculated which is determined by engine-generated torque $\tau_e$ and actual variable speed ratio R, and the regulating hydraulic pressure actuator 240 is operated.

Then, at step S405, a routine for variable speed hydraulic pressure calculation, a variable speed hydraulic pressure $P_R$ is calculated which corresponds to the difference between the target input shaft rotation speed $N_{IS}$ and the actual input shaft rotation speed $N_I$, and the variable speed hydraulic pressure actuator 241 is driven.

In the processing routine shown in FIG. 2, it is so arranged that in case the throttle is not fully opened by reason of insufficient negative pressure reduction when the vehicle is on an uphill road during its constant speed cruise, variable speed ratio control is performed for increasing the target variable speed ratio $R_S$ so that sufficient acceleration power can be obtained.

Similarly, in case that when the vehicle on a downhill road, actual vehicle speed $V_W$ tends to exceed the predetermined vehicle speed despite the fact that the throttle is totally closed, the target variable speed ratio $R_S$ is increased through a combination of throttle control and variable speed ratio control in order to enhance engine brake performance.

In the conventional constant speed holding apparatus, however, there may be cases where speed fluctuation occurs as a result of mutual interference between constant speed control through the operation of the throttle actuator 140 and variable speed ratio control through changes in variable speed ratio during constant speed cruise of the vehicle, when there is only a slight difference between the actual vehicle speed $V_W$ and the predetermined vehicle speed. It has been impossible to prevent such speed fluctuation.

SUMMARY OF THE INVENTION

The present invention is intended to solve aforesaid problem of the prior art, and accordingly it is a primary object of the invention to provide a constant speed holding apparatus which can prevent any possible interference due to variable speed ratio control and constant speed cruise control by maintaining the variable speed ratio when, during constant speed cruising, the difference between the actual vehicle speed and a predetermined vehicle speed is very slight, thereby to inhibit speed fluctuation and ensure steady, cruising at constant speed.

The above and further objects and features of the invention will be more fully apparent from the following detailed description with accompanying drawings.

DESCRIPTION OF THE PREFERRED EMBODIMENTS

Figure 3:
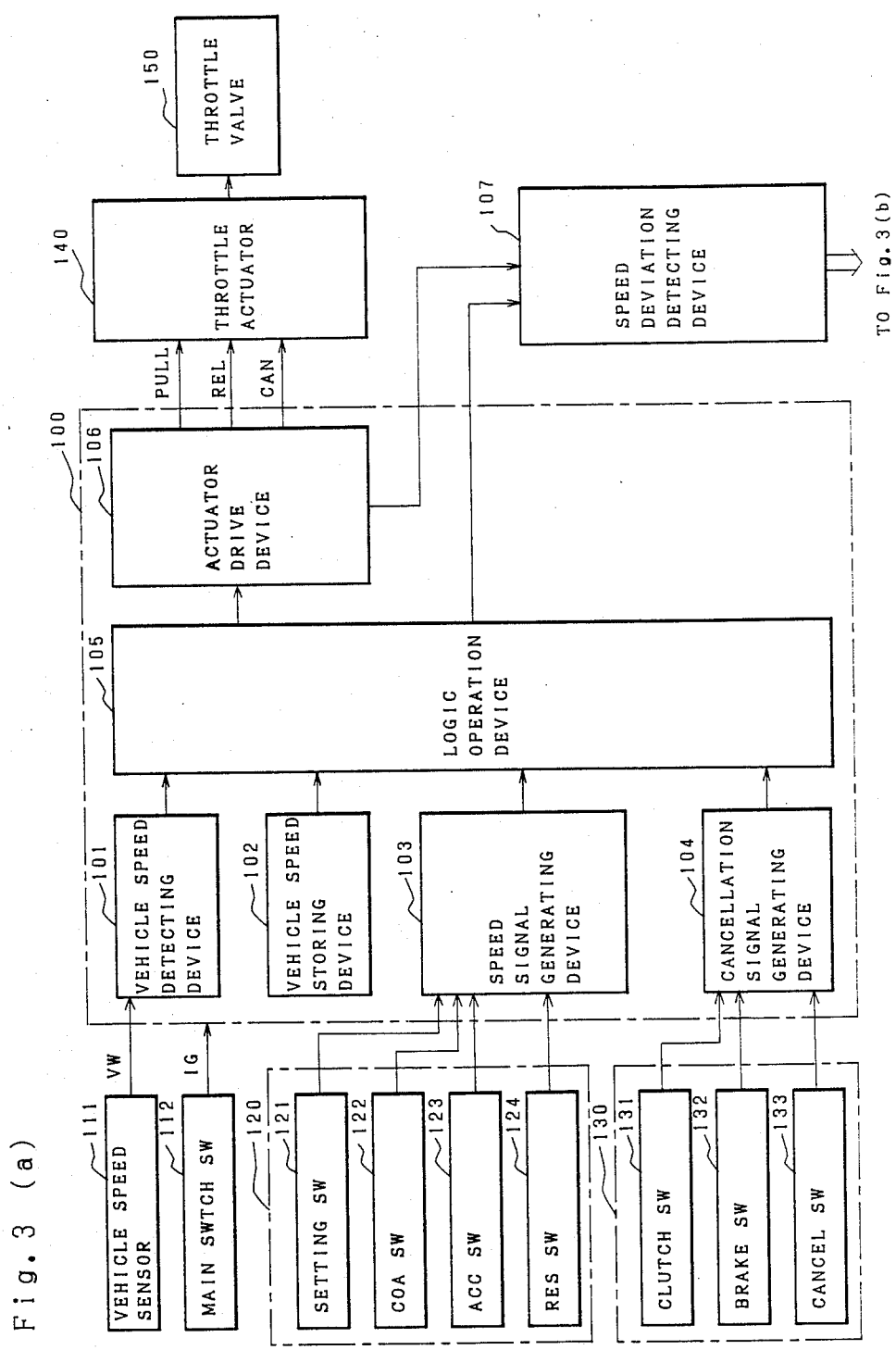
FIG. 3(a) and (b) is a block diagram showing the arrangement of a constant speed holding apparatus according to the invention.
Figure 3:
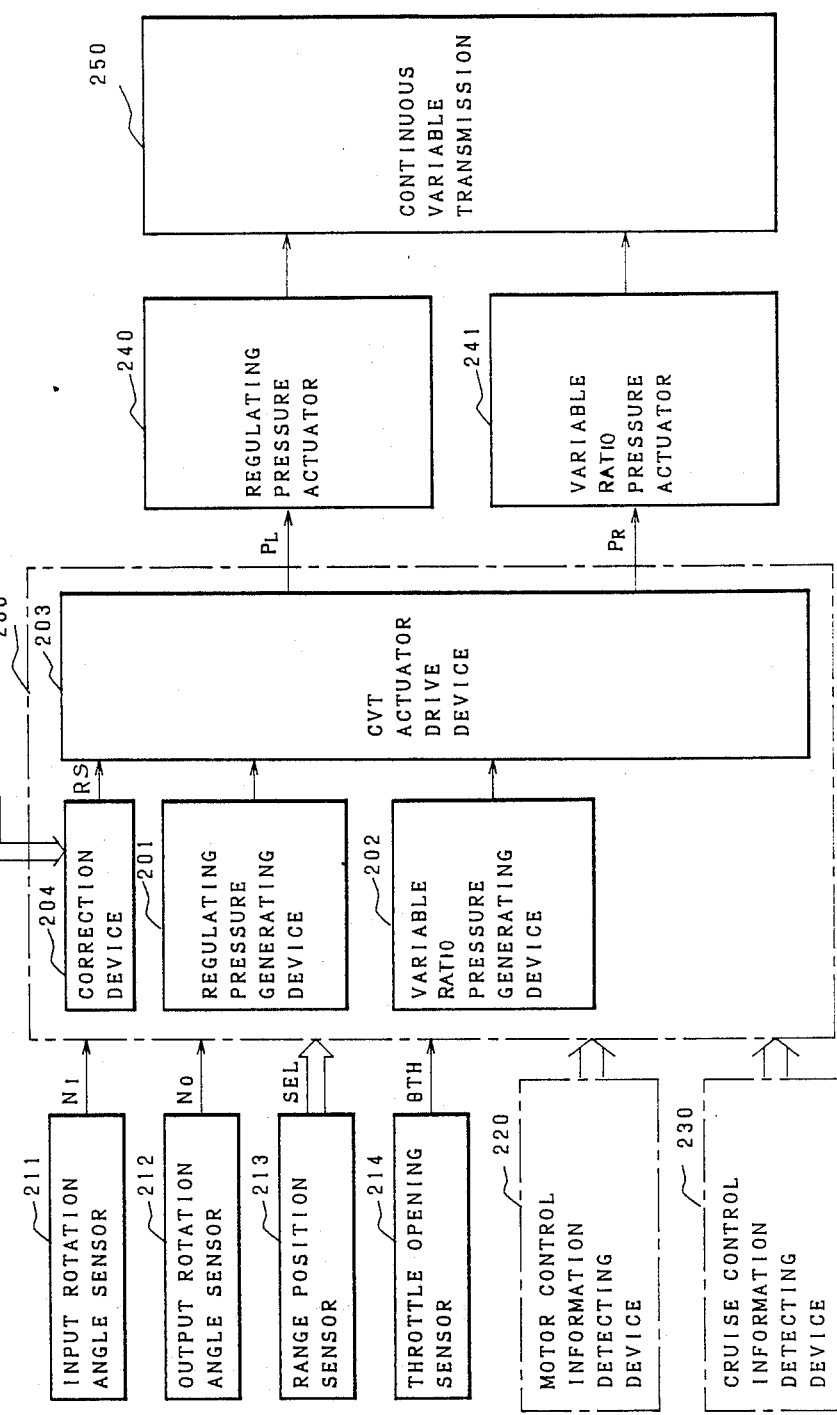

FIG. 3(a) and (b) is a block diagram showing the arrangement of the constant speed holding apparatus in accordance with the invention.

In FIG. 3(a), the numeral 100 designates a constant speed cruise control unit, which comprises a vehicle speed detecting device 101, a vehicle speed memory device 102, a speed signal generating device 103, a cancellation signal generating device 104, a logic operation device 105, an actuator drive device 106, and a speed deviation detecting device 107.

The constant speed cruise control unit 100 receives an actual vehicle speed signal $V_W$ from a vehicle speed sensor 111, the actual vehicle speed $V_W$ being then detected by the vehicle speed detecting device 101. The detected actual speed value is outputted to the logic operation device 105, which also receives relevant data from the vehicle speed memory device 102. In the memory device 102, a preset vehicle speed value or a target vehicle speed value set by the driver is stored.

The numeral 120 designates a group of command switches, i.e., switches for cruise condition setting by the driver. They include a set switch 121, a COA switch 122, an ACC switch 123, and an RES switch 124.

The set switch 121 is a command switch which stores a present vehicle speed as a set vehicle speed and controls the cruise speed of the vehicle thereafter on the basis of the stored set vehicle speed.

The COA switch 122 is a command switch for use in reducing the set vehicle speed to a level below the existing vehicle speed.

The ACC switch 123 is a command switch for use in increasing the set vehicle speed to a level above the existing vehicle speed, which performs acceleration control to provide better acceleration feeling.

The RES switch 124 is a command switch for providing an accelerated or decelerated cruise condition or a constant speed cruise condition on the basis of a previously stored set vehicle speed as a target value.

The output of each of the group of command switches 120 is sent to the speed signal generating device 103 of the constant speed cruise control unit 100.

The speed signal generating device 103, as it receives the output of each of the command switches 120, generates a corresponding speed signal and outputs the same to the logic operation device 105.

The numeral 130 designates a group of cancellation switches as means for detecting conditions for cancellation. The cancellation switches 130 include a clutch switch 131, a brake switch 132, and a cancel switch 133.

The cancellation switches 130 are for canceling the existing state of constant speed control by the manipulation of a driver, the output of the switches 130 being sent to the cancellation signal generating device 104 of the constant speed cruise control unit 100.

It is generally known that both the cancellation switches 130 and the command switches 120 can be arranged in various ways according to the types of the vehicles in which they are mounted, but their basic roles are essentially same in all cases.

The logic operation device 105 in the constant speed cruise control unit 100 performs a specified logic operation on the basis of the outputs from the vehicle speed detecting device 101, the vehicle speed memory device 102, the speed signal generating device 103, and the cancellation signal generating device 104, to control the actuator drive device 106, thereby to drive a throttle actuator 140, through which the opening of a throttle valve 150 is controlled to permit constant speed cruise of the vehicle at the set vehicle speed.

The speed deviation detecting device 107, which is the subject matter of the invention, receives the output of the logic operation device 105 and the output of the actuator drive device 106.

This speed deviation detecting device 107 serves as means for detecting minute speed changes during a constant speed cruise of the vehicle.

That is, the device 107 is for detecting the difference between the set vehicle speed and the actual speed when the difference is smaller than a specified value.

The output of the speed deviation detecting device 107 is sent to a correction device 204 which will be described hereinafter.

A continuous variable transmission 250 includes pulleys disposed at its input and output sides and a V-belt, each of the pulleys being hydraulically variable in P.C.D so that the transmission 250 is variable in variable speed ratio as shown in FIG. 3(b).

A continuous variable transmission control unit 200 consists of a regulating hydraulic pressure generating device 201, a variable speed hydraulic pressure generating device 202, a CVT (continuous variable transmission) actuator drive device 203 as continuous variable transmission regulating means, and a correction device 204.

The continuous variable transmission control unit 200 receives outputs of various cruise information detecting devices including an input rotation angle sensor 211 and an output rotation angle sensor 212, both for detecting an actual variable speed ratio, and also of a range position sensor 213 for drawing such cruise performance as desired by the driver, a throttle opening sensor 214 for detecting necessary throttle opening for meeting the driver's acceleration requirements, an engine-control information detecting device 220 for detecting information necessary for determining the condition of the engine, and a vehicle cruise control information detecting device 230 for detecting information necessary for vehicle cruise, and accordingly drives a regulating hydraulic pressure actuator 240 for regulating the hydraulic pressure from the output-side pulley of the continuous variable transmission correspondingly to the transmission power of the engine and a variable speed hydraulic pressure actuator 241 for controlling the hydraulic pressure from the input-side pulley of the continuous variable transmission correspondingly to the variable speed ratio.

The correction device 204 performs variable speed ratio correction in order to maintain the variable speed ratio of the continuous variable transmission 250 when it receives the output of the speed deviation detecting device 107, that is, minute speed deviation information.

Next, the manner of operation will be explained.

Figure 1:
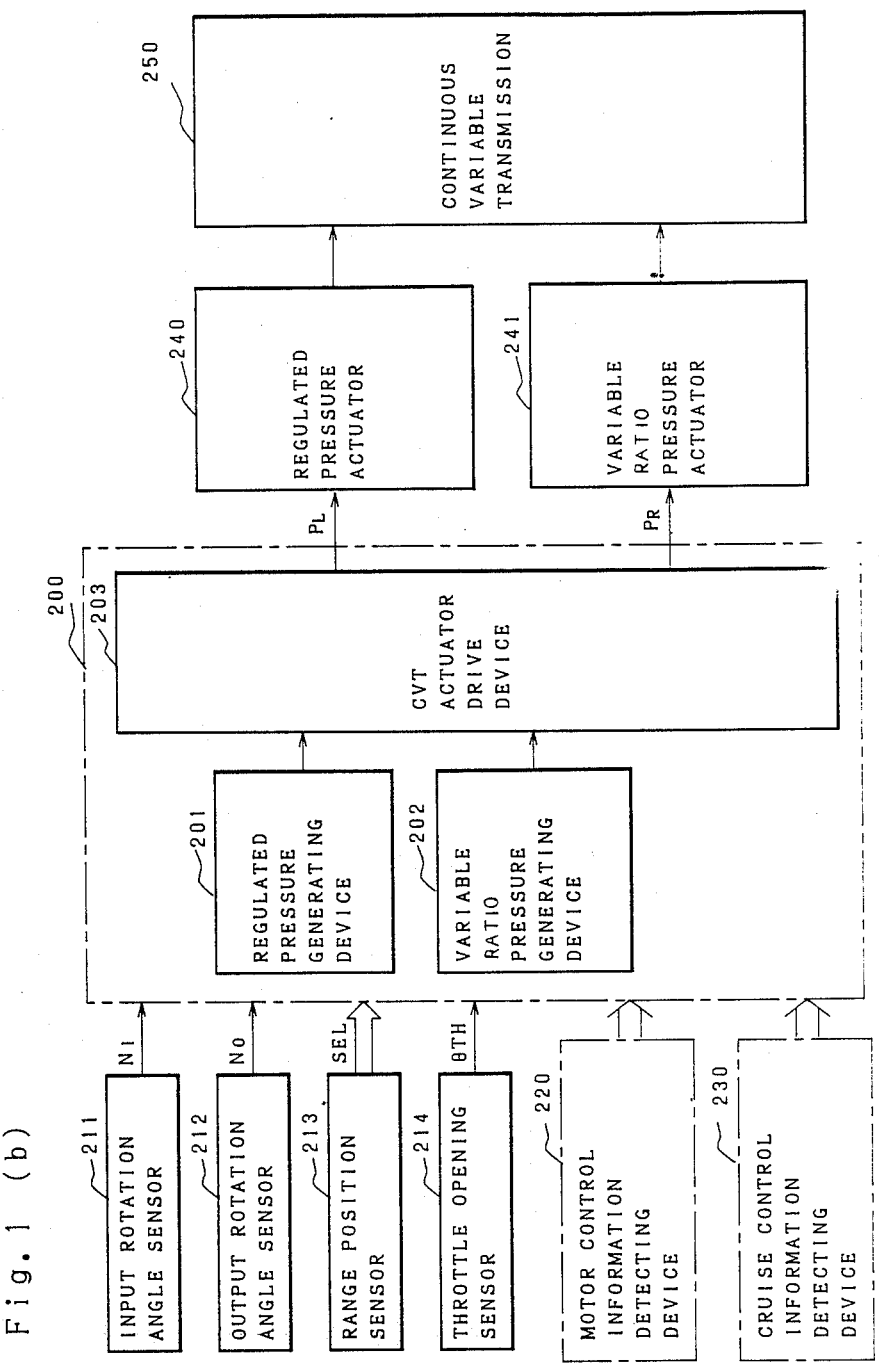
FIG. 1(a) and (b) is a block diagram showing the arrangement of a conventional constant speed holding apparatus.
Figure 2:
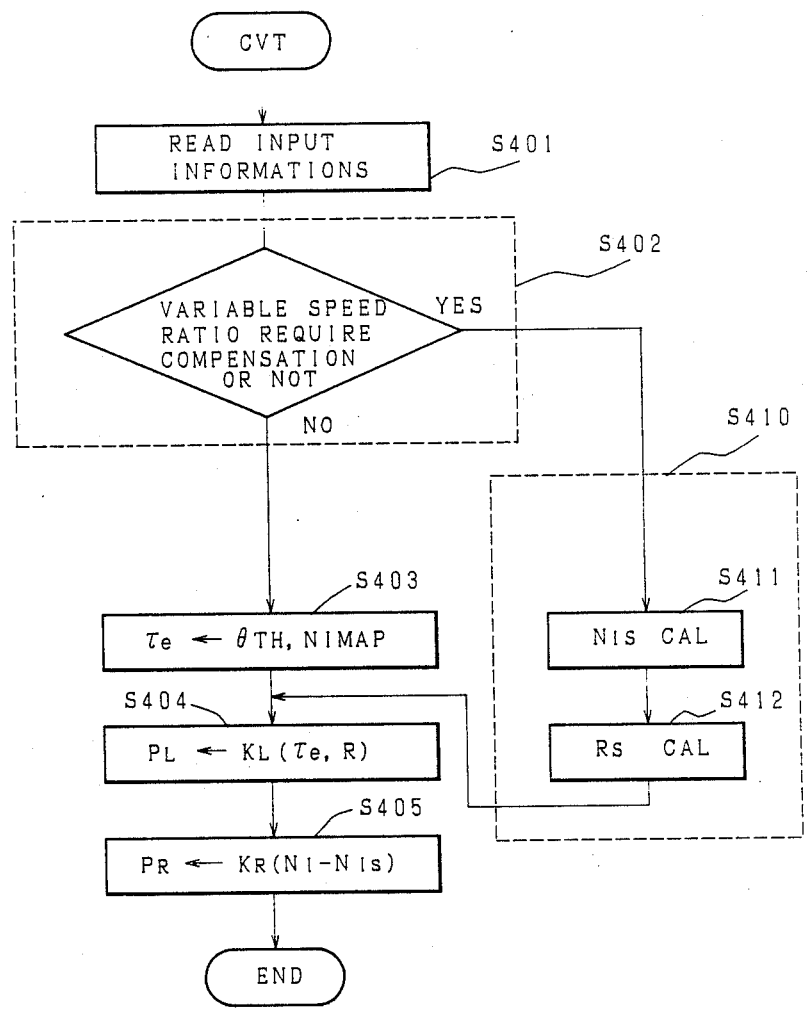
FIG. 2 is a flow chart illustrating the operation of a continuous variable transmission control unit of the constant speed holding device including certain aspects of the invention.
Figure 4:
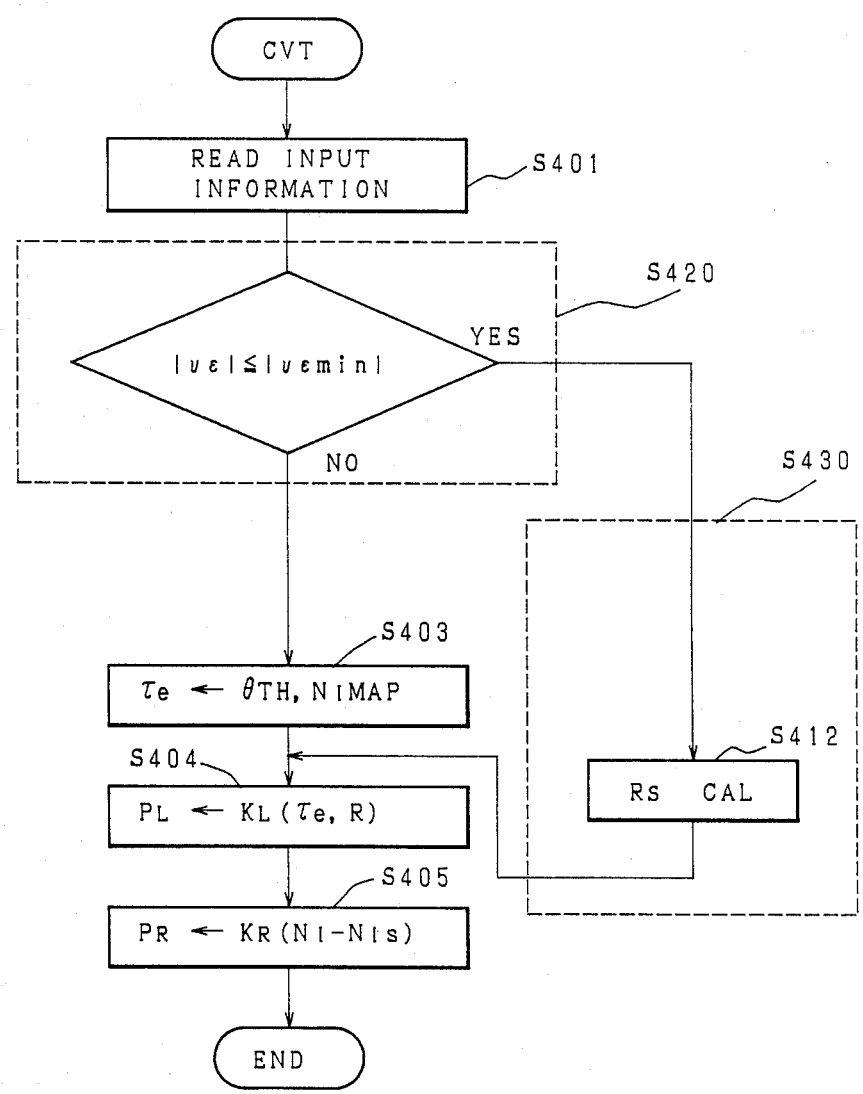
FIG. 4 is a flow chart illustrating the operation of a continuous variable transmission control unit of the constant speed holding apparatus of the invention.

FIG. 4 is a flow chart illustrating the sequence of operations of the continuous variable transmission control unit 200 of the constant speed holding device according to the invention. In the case of normal run, the sequence of control for the continuous variable transmission 250 is such that at step S401, various input data, such as input shaft rotation speed data $N_I$ from the input rotation angle sensor 211, output shaft rotation speed data $N_O$ from the output rotation angle sensor 212, range position signal Sel from the range position sensor 213, and throttle opening data $\theta_{TH}$ from the throttle opening sensor 214, are read by the continuous variable transmission control device 200 in same way as in the FIG. 2 case.

Then, if the decision at the next step S420, a speed deviation determining routine 420, is that the difference $V_\epsilon$ between the set vehicle speed $V_{\epsilon min}$ and the actual vehicle speed is not within a minute vehicle speed deviation range, processing advances to step 403 which performs an engine characteristic calculation.

At step S403, the continuous variable transmission control unit 200 calculates an engine torque $\tau_e$ on the basis of various input data read at step S401. At step S404, a regulated hydraulic pressure value $P_L$ is calculated from both the engine torque $\tau_e$ and the variable speed ratio R. For the purpose of this calculation a map is used.

At step S405, a variable speed hydraulic pressure calculation routine, calculation is made for a variable speed hydraulic pressure value $P_R$ corresponding to the difference between the target input shaft rotation speed $N_{IS}$ and the actual input shaft rotation speed $K_R$ ($N_I - N_{IS}$).

The regulating hydraulic pressure actuator 240 is operated according to the regulated hydraulic pressure value $P_L$ thus calculated, and at same time the variable speed hydraulic pressure actuator 241 is operated according to the variable speed hydraulic pressure value $P_R$.

Thus, by means of the regulating hydraulic pressure actuator 240 and the variable speed hydraulic pressure actuator 241, variable speed ratio control of the continuous variable transmission 250 is performed.

If at step S420 the speed deviation detecting device 107 detects the fact that the difference between the set vehicle speed and the actual vehicle speed is within a comparatively minute speed deviation range ($V_\epsilon \leq V_{\epsilon min}$), processing advances to step S430, a variable speed ratio compensation routine, and minute speed deviation data is sent from the speed deviation detecting device 107 to the correction device 204.

Thus, the correction device 204 sets a target variable speed ratio $R_S$ for the continuous variable transmission 250, and then job proceeds to step S404. Operation at steps S404 and S405 is carried out in same manner as in the earlier described, whereby the target variable speed ratio can be maintained and cruise performance with a fixed variable speed ratio can be obtained.

As above described, according to the invention, when the vehicle speed deviation detecting device detects a minute speed deviation in which the difference between the set vehicle speed and the actual vehicle speed is comparatively small, the correction device acts to maintain the variable speed ratio at a certain value so that the vehicle is allowed to cruise with a fixed variable speed ratio. Thus, any possible interference due to both variable speed ratio control and constant speed cruise control can be prevented during vehicle cruise, so that stable vehicle cruise at constant speed is assured.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A constant speed holding apparatus comprising:
   a vehicle speed sensor which outputs a signal indicating an actual vehicle speed;
   cruise conditions setting means for setting cruise conditions including a target vehicle speed to be maintained;
   cancellation conditions detecting means for detecting conditions for cancellation of said cruise conditions;
   a throttle actuator for controlling a throttle opening of an engine;
   constant speed cruise control means for driving said throttle actuator to perform constant speed cruise control in order to maintain said target vehicle speed on the basis of the signal outputted from said vehicle speed sensor which indicates the actual vehicle speed and on the basis of the cruise conditions set by said cruise conditions setting means;
   speed deviation detecting means for detecting when a deviation of said actual speed from said target speed is smaller than a predetermined minute value;
   a continuous variable transmission disposed in a power train for power transmission from said engine;
   cruise information detecting means for detecting cruise information including said throttle opening; and
   continuous variable transmission controlling means performing variable speed ratio control of said continuous variable transmission to maintain said target cruise speed on the basis of said cruise information detected by said cruise information detecting means, and upon detection that said deviation is smaller than said predetermined minute value, acting to maintain the variable speed ratio of said continuous variable transmission at an existing variable speed ratio.

2. A constant speed holding apparatus as set forth in claim 1, wherein said constant speed cruise control means comprises:
   vehicle speed memory means for storing therein said target vehicle speed set by said cruise conditions setting means;
   speed signal generating means generating a speed signal corresponding to said cruise conditions;
   cancellation signal generating means generating a signal for canceling the operation of said throttle actuator on the basis of the detected result by said cancellation conditions detecting means;
   logic operation means performing a predetermined logic operation on the basis of outputs of said vehicle speed sensor, said vehicle speed memory means, said speed signal generating means, and said cancellation signal generating means; and
   actuator drive means for controlling the throttle opening of said throttle actuator on the basis of an output of said logic operation means.

3. A constant speed holding apparatus as set forth in claim 2, wherein said speed deviation detecting means detects said deviation on the basis of outputs of said logic operation means and said actuator drive means.

4. A constant speed holding apparatus as set forth in claim 1, wherein said continuous variable transmission control means comprises:
   regulating hydraulic pressure generating means outputting a signal for generating a regulating hydraulic pressure for adjusting the transmission power of said continuous variable transmission corresponding to the drive power of said engine;
   variable speed hydraulic pressure generating means outputting a signal for generating variable speed hydraulic pressure for controlling the variable speed ratio of said continuous variable transmission;
   continuous variable transmission regulating means for regulating said regulating hydraulic pressure and said variable speed hydraulic pressure and said variable speed hydraulic pressure acting on said continuous variable transmission on the basis of signals outputted from said regulating hydraulic pressure generating means and said variable speed hydraulic pressure generating means; and
   correction means acting to maintain the variable speed ratio of said continuous variable transmission at an existing variable speed ratio upon detecting that said deviation is smaller than said predetermined minute value.

* * * * *